United States Patent
Corston-Petrie et al.

(10) Patent No.: US 12,089,147 B2
(45) Date of Patent: Sep. 10, 2024

(54) TELECOMMUNICATIONS NETWORK

(71) Applicant: BRITISH TELECOMMUNICATIONS PUBLIC LIMITED COMPANY, London (GB)

(72) Inventors: Andrew Corston-Petrie, London (GB); Maria Cuevas Ramirez, London (GB)

(73) Assignee: British Telecommunications Public Limited Compny (GB)

( * ) Notice: Subject to any disclaimer, the term of this patent is extended or adjusted under 35 U.S.C. 154(b) by 345 days.

(21) Appl. No.: 17/310,516

(22) PCT Filed: Jan. 15, 2020

(86) PCT No.: PCT/EP2020/050889
§ 371 (c)(1),
(2) Date: Aug. 6, 2021

(87) PCT Pub. No.: WO2020/160884
PCT Pub. Date: Aug. 13, 2020

(65) Prior Publication Data
US 2022/0191777 A1  Jun. 16, 2022

(30) Foreign Application Priority Data
Feb. 6, 2019  (EP) .................................. 19155681

(51) Int. Cl.
H04W 48/18 (2009.01)
H04W 76/12 (2018.01)
H04W 88/14 (2009.01)

(52) U.S. Cl.
CPC .......... *H04W 48/18* (2013.01); *H04W 76/12* (2018.02); *H04W 88/14* (2013.01)

(58) Field of Classification Search
CPC ...... H04W 48/18; H04W 76/12; H04W 88/14
(Continued)

(56) References Cited

U.S. PATENT DOCUMENTS

2017/0367036 A1  12/2017  Chen et al.
2018/0132138 A1  5/2018  Senarath et al.
(Continued)

FOREIGN PATENT DOCUMENTS

CN  107580360 A  1/2018
CN  108141756 A  6/2018
(Continued)

OTHER PUBLICATIONS

3GPP TR 28 801 V15.1.0 (Jan. 2018) "3rd Generation Partnership Project; Technical Specification Group Services and System Aspects; Telecommunication Management; Study on Management and Orchestration of Network Slicing for Next Generation Network (Release 15)," Jan. 4, 2018, pp. 20, 30, 34-35, 47-54,55, 75 pages.
(Continued)

*Primary Examiner* — Obaidul Huq
(74) *Attorney, Agent, or Firm* — Pranger Law PC (57) ABSTRACT

This disclosure provides a method, and a network node for implementing the method, for establishing a multi-domain network slice in a telecommunications network, the telecommunications network being an internetwork of a first network domain and second network domain, in which the first network domain and second network domain are of different network types being one of an access network, backhaul network and a core network, wherein a network node includes a network slice database storing data on a plurality of network slices established in the first and second network domains.

10 Claims, 4 Drawing Sheets

(58) Field of Classification Search
USPC .................................... 370/310, 328, 329
See application file for complete search history.

(56) References Cited

U.S. PATENT DOCUMENTS

| | | | |
|---|---|---|---|
| 2018/0262979 A1 | 9/2018 | Wang et al. | |
| 2018/0316564 A1 | 11/2018 | Senarath | |
| 2018/0316615 A1* | 11/2018 | Shaw | H04L 41/0806 |
| 2018/0324577 A1 | 11/2018 | Faccin et al. | |
| 2018/0332441 A1 | 11/2018 | Shaw et al. | |
| 2018/0352501 A1 | 12/2018 | Zhang et al. | |
| 2019/0026094 A1 | 1/2019 | Stammers et al. | |
| 2019/0037409 A1 | 1/2019 | Wang et al. | |
| 2019/0075452 A1 | 3/2019 | Avula et al. | |
| 2019/0174321 A1 | 6/2019 | Sun et al. | |
| 2019/0357129 A1* | 11/2019 | Park | H04W 60/04 |
| 2020/0236594 A1* | 7/2020 | Tang | H04W 28/24 |
| 2021/0153077 A1 | 5/2021 | Samdanis et al. | |
| 2021/0250853 A1 | 8/2021 | Corston-Petri et al. | |

FOREIGN PATENT DOCUMENTS

| | | |
|---|---|---|
| CN | 108432323 A | 8/2018 |
| CN | 108713327 A | 10/2018 |
| CN | 109218046 A | 1/2019 |
| WO | WO-2016192636 A1 | 12/2016 |
| WO | 2017063708 A1 | 4/2017 |
| WO | WO-2017113100 A1 | 7/2017 |
| WO | 2017140375 A1 | 8/2017 |
| WO | WO-2017147271 A1 | 8/2017 |
| WO | WO-2017200264 A1 | 11/2017 |
| WO | WO-2018006221 A1 | 1/2018 |
| WO | WO-2018072824 A1 | 4/2018 |
| WO | WO-2018082221 A1 | 5/2018 |
| WO | WO-2018171375 A1 | 9/2018 |
| WO | WO-2018175260 A1 | 9/2018 |
| WO | WO-2019007360 A1 | 1/2019 |

OTHER PUBLICATIONS

3GPP TS 23.501 V15.2.0 (Jun. 2018) "3rd Generation Partnership Project; Technical Specification Group Services and System Aspects; System Architecture for the 5G System; Stage 2 (Release 15)," 217 pages.
3GPP TS 23.502 V15.2.0 (Jun. 2018) "3rd Generation Partnership Project; Technical Specification Group Services and System Aspects; Procedures for the 5G System;Stage 2 (Release 15)," 308 pages.
An X. et al., "On end to end network slicing for 5G communication systems," Jun. 23, 2016, 11 pages.
Extended European Search Report For Application No. 19155681.0, mailed on Mar. 20, 2019, 12 pages.
Extended European Search Report for EP Application No. 18178333.3, mailed on Jun. 12, 2018, 13 pages.
GB Combined Search and Examination Report for GB Application No. GB1901616.1mailed Jul. 12, 2019, 8 pages.
GSMA, "An Introduction to Network Slicing," 3GPP Draft; GSMA—An-Introduction-To-Network-Slicing; 3rd Generation Partnership Project (3GPP), Mobile Competence Centre; 650, Route Deslucioles; F-06921 Sophia-Antipolis Cedex; France, Apr. 8, 2018 (Apr. 8, 2018), XP051433615, Retrieved from the Internet: URL: https://www.3gpp.org/ftp/Meetings_3GPP_SYNC/SA5/Docs [retrieved on Apr. 8, 2018] paragraph 2, 20 pages.
Huawei "Adding Use Case and Requirements for E2E Network Slice Creation Supporting End-User Services," 3GPP Draft; S5-166150 PCR TR 28.801 Adding Use Case and Requirements for E2E Network Slice Creation Supporting End User Services, 3rd Generation Partnership Project (3GPP), Mobile Competence Centre; vol. SA WG5, No. Reno (US); Nov. 14, 2016-Nov. 18, 2016, Nov. 13, 2016 (Nov. 13, 2016), XP051187522, Retrieved from the Internet: URL: https://www.3gpp.org/ftp/Meetings_3GPP_SYNC/SA5/Docs [retrieved on Nov. 13, 2016] paragraph 5.X, 10 pages.
Huawei: "Clarification on TN Coordination in Clause 5.1.1," item V: 3GPP Draft, S5-181162 PCR 28.531 Clarification on Tncoordination Issue in Clause 5.1.1, 3rd Generation Partnership Project (3GPP), Mobile Competence Centre, 650, Route Des Lucioles, F-06921 Sophia-, vol. SA WG5, Rome, Italy; Jan. 29, 2018-Feb. 2, 2018, Jan. 19, 2018(Jan. 19, 2018), XP051391247 Retrieved from the Internet: URL: https://www.3gpp.org/ftp/Meetings_3GPP_SYNC/SA5/Docs [retrieved on Jan. 19, 2018] paragraph 6.3, 8 pages.
Huawei, "Key principles for Support of Network Slicing in RAN," RAN WG3 Meeting #92, R3-161133,May 23-27, 2016, 6 pages.
Huawei, "Network Slice Selection," RAN WG3 Meeting #92, R3-161134, May 23-27, 2016, 4 pages.
International Preliminary Report on Patentability for Application No. PCT/EP2020/050889, mailed on Jan. 21, 2021, 17 pages.
International Search Report and Written Opinion for Application No. PCT/EP2020/050889, mailed on Mar. 12, 2020, 13 pages.
Motorola Mobility., et al., "Solution: PDU Sessions Served by Different Network Slices," SA WG2 Meeting #114, S2-161574, Apr. 11-15, 2016, 4 pages.
NGMN, "5G White Paper," Feb. 17, 2015, 125 pages.
Nokia et al., "Slice Selection solution update," SA WG2 Meeting #115, S2-1613111, May 23-27, 2016, 12 pages.
Notification of Transmittal of the International Search Report and Written Opinion of the International Searching Authority for Application No. PCT/EP2019/065212, mailed on Sep. 16, 2019, 18 pages.
Office Action for GB Application No. 1809944.0, mailed on Dec. 24, 2018, 5 pages.
Office Action for GB Application No. 1809944.0, mailed on Mar. 29, 2021, 4 pages.
"Office Action received for Chinese Patent Application No. 201980040019.X, mailed on Jun. 14, 2023", 6 pages (Official Copy Only).
"Office Action received for Chinese Patent Application No. 202080008532.3, mailed on Sep. 25, 2023", 7 pages (English Translation Only).
Nokia , "Slice Selection Solution Update", S2-163111 was S2-162982 was S2-162717-MDD, 3GPP tsg_sa \WG2_Arch, May 23-27, 2016, pp. 1-12.
"International Preliminary Report on Patentability for Application No. PCT/EP2019/065212, mailed on Dec. 30, 2020", 11 pages.

* cited by examiner

TELECOMMUNICATIONS NETWORK

PRIORITY CLAIM

The present application is a National Phase entry of PCT Application No. PCT/EP2020/050889, filed Jan. 15, 2020, which claims priority from EP Patent Application No. 19155681.0, filed Feb. 6, 2019, each of which is hereby fully incorporated herein by reference.

TECHNICAL FIELD

The present disclosure relates to a telecommunications network.

BACKGROUND

A conventional telecommunications network used dedicated hardware and software components that performed specific tasks. This gave network operators fine control over its infrastructure such that it could be carefully planned and deployed. However, this was also inflexible such that all parts of the infrastructure must serve all forms of services (e.g. voice, file transfer, Device-to-Device communications), rather than be tailored for providing the optimal configuration for a particular service. To address this issue, a technique called network slicing has been introduced.

Network slicing is a technique for creating differentiated logical networks on common infrastructure. It allows networking infrastructure to be optimized for a particular service, end-user or network operator by deploying specifically configured or tailored network functions on virtualized hardware, software-controlled networks and/or customized physical hardware. This may be performed for one or more network functions across one or more nodes in the network, including the access network, backhaul network and core network. In doing so, a collection of logical network functions (and the virtual network that connects them) may be grouped into a network slice which utilizes virtualized network functions, software-controlled networks and/or customized physical hardware on one or more nodes in the network. Each network slice may then be configured (e.g. by configuring each virtual function of the network slice) such that it is optimized for a particular use case. For example, in a cellular network, a first network slice for an autonomous vehicle application may be configured on one or more nodes in the cellular network to deliver an ultra-high reliability and ultra-low latency service, and further network slices configured for other applications may also be run on the same nodes through further virtual functions.

A complete cellular network is an internetwork of a radio access network, a backhaul network and a (mobile) core network. Furthermore, the core network may have onward connections to other networks, such as the Internet or an application hosting domain (such as public or private data center). To implement a network slice across all networks (i.e. an "end-to-end" slice), the network slice must maintain consistent attributes across these networks in order to meet the requirements of the desired service. This is relatively simple to implement if the radio access, backhaul and core networks are all implemented by a single operator, but there are problems in multi-operator scenarios (such as when the radio access network is owned by a first operator and a backhaul network is owned by a second operator) in that network slice attributes and/or identifiers may differ between operators. Possible solutions to this problem include standardization of network slice capabilities and identifiers. However, this would limit flexibility.

It is therefore desirable to alleviate some or all of the above problems.

SUMMARY

According to a first aspect of the disclosure, there is provided a method for establishing a multi-domain network slice in a telecommunications network, the telecommunications network being an internetwork of a first network domain and second network domain, in which the first network domain and second network domain are of different network types being one of an access network, backhaul network and a core network, wherein a network node includes a network slice database storing data on a plurality of network slices established in the first and second network domains, the method comprising: the network node receiving data indicating a change to the plurality of network slices established in the first and second network domains and, in response, updating the network slice database; the network node receiving a request from the first network to establish a multi-domain network slice across the first and second network, the multi-domain network slice using a first network slice on a first set of network nodes of the first network and a second network slice operating on a second set of network nodes of the second network, wherein the request includes requirement data for the multi-domain network slice; the network node identifying the second network slice by: retrieving, from the network slice database, network slice capability data for the second network slice, the network slice capability data indicating the second network slice's capability for one or more metrics, comparing the retrieved network slice capability data for the second network slice with requirement data for the multi-domain network slice, and selecting the second network slice based on the comparison; and the network node responding to the request with an identifier for the second network slice.

The network node may have a database storing data on a plurality of network slices in both the first and second networks. The network node may be independent of the first and second networks.

The request may further include network slice capability data of the first network slice for the one or more metrics, and the comparison may include comparing a sum of 1) the capability data of the first network slice for the one or more metrics and 2) the retrieved network slice capability data of the second network slice for the one or more metrics with the set of requirements for the one or more metrics.

The request may further include a weighting associated with each metric, and comparing the second network slice's capability for the one or more metrics with the set of requirements for the one or more metrics may use the weighting associated with each metric.

The first network may be operated by a first network operator and the second network may be operated by a second network operator.

The network node may identify a second and third network slice by: retrieving network slice capability data for the second and third network slices, the network slice capability data indicating the second network slice's capability for one or more metrics and the third network slice's capability for one or more metrics, comparing the retrieved network slice capability data for the second and third network slices with requirement data for the multi-domain network slice, and selecting the second and third network slices based on the comparison, and the step of the network node responding to the request may include the identifier for both the second and third network slices.

The second and third network slices may be of a second and third network domain respectively, wherein the first and third network domains may be of different network types and third network domain may be one of the radio access, backhaul and core network types.

The telecommunications network may be a cellular network.

According to a second aspect of the disclosure, there is provided a computer program product comprising instructions which, when the program is executed by a computer, cause the computer to carry out the method of the first aspect of the disclosure. The computer program may be stored on a computer-readable data carrier.

According to a third aspect of the disclosure, there is provided network node for establishing a multi-domain network slice in a telecommunications network, the telecommunications network being an internetwork of a first network domain and second network domain, in which the first network domain and second network domain are of different network types being one of an access network, backhaul network and a core network, the network node comprising: memory including a network slice database storing data on a plurality of network slices established in the first and second network domains; a transceiver configured to receive: data indicating a change to the plurality of network slices established in the first and second network domains, and a request from one of a first set of network nodes in the first network domain to establish a multi-domain network slice across the first and second network domains, the multi-domain network slice using a first network slice operating on one or more of the first set of network nodes of the first network domain and a second network slice operating on one or more of a second set of network nodes of the second network domain, wherein the request includes requirement data for the multi-domain network slice for one or more attributes; and a processor configured to: update the network slice database in response to the data indicating a change to the plurality of network slices, and further configured to: identify the second network slice by: retrieving, from the network slice database, network slice capability data for the second network slice, the network slice capability data indicating the second network slice's capability for the one or more attributes, comparing the retrieved network slice capability data for the second network slice with the requirement data for the multi-domain network slice, and selecting the second network slice based on the comparison; wherein the transceiver is further configured to respond to the request with an identifier for the second network slice.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
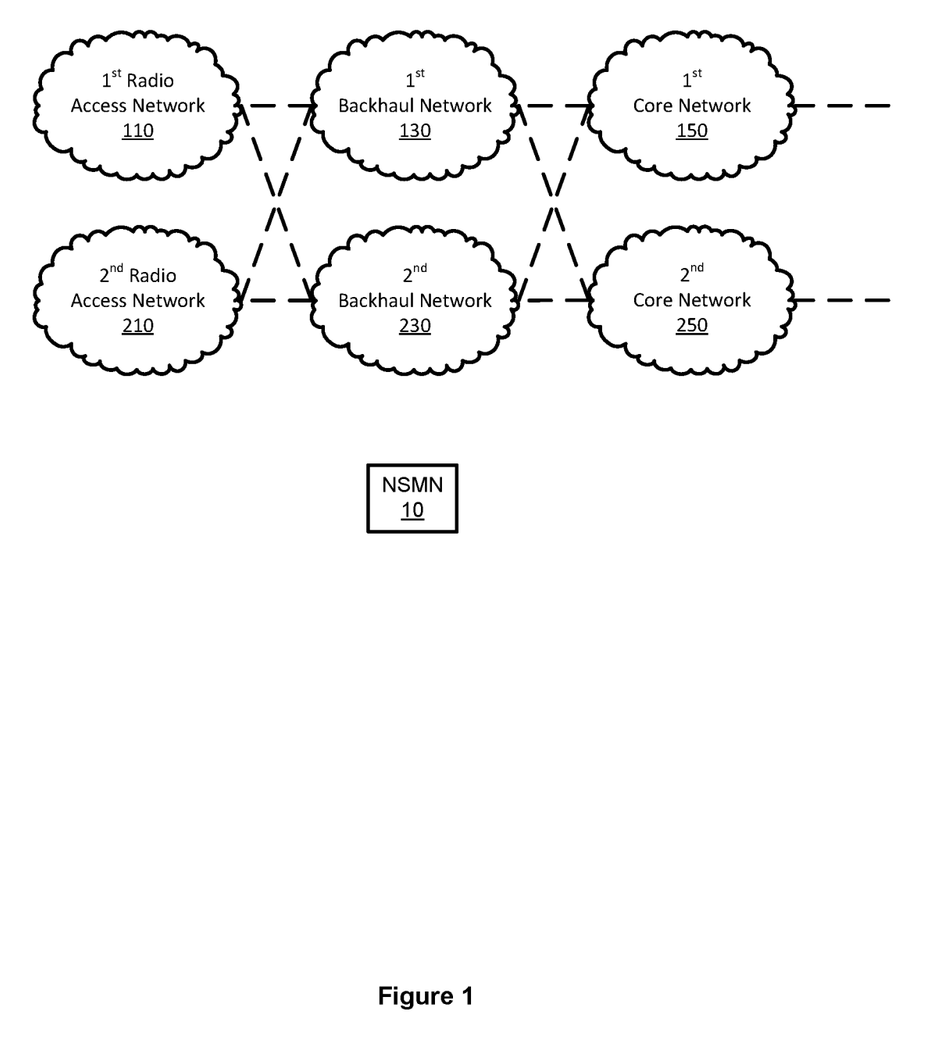
FIG. 1 is a schematic diagram of an embodiment of a cellular telecommunications network of the present disclosure.
Figure 2:
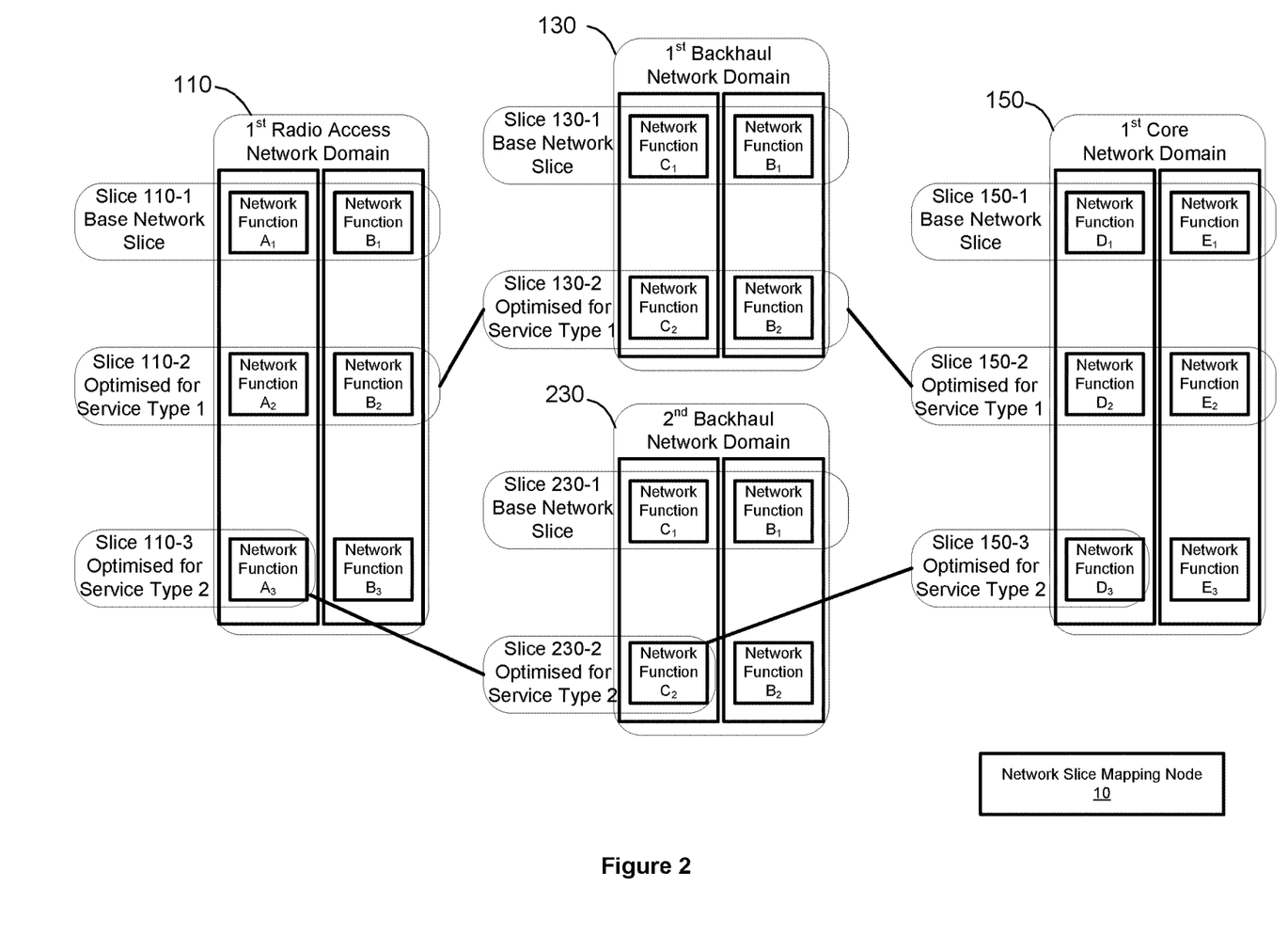
FIG. 2 is a schematic diagram illustrating several network slices on the cellular telecommunications network of FIG. 1.

A first embodiment of a cellular telecommunications network of the present disclosure will now be described with reference to FIGS. 1 to 3. FIG. 1 illustrates first and second radio access networks 110, 210, first and second backhaul networks 130, 230, and first and second core networks 150, 250. In this embodiment, each radio access, backhaul and core network are operated by a different Network Operator (NO). A full cellular network may be formed as an internetwork between either the first or second radio access network 110, 210, with either the first or second backhaul network 130, 230, and with either the first or second core network 150, 250. FIG. 1 illustrates multiple connections between each radio access network and each backhaul network, and between each backhaul network and each core network. A User Equipment (UE) may connect to either of the first or second radio access networks 110, 210 to receive voice and data services. Although not shown, the first and second core networks 150, 250 have onward connections to further networks (e.g. the Internet).

FIG. 1 also illustrates a network slice mapping node 10. The purpose and operation of this network slice mapping node 10 will become clear upon review of the following description.

The first and second radio access networks 110, 210, first and second backhaul networks 130, 230 and first and second core networks 150, 250 include one or more network nodes that are configured to implement network slicing. Accordingly, each network may implement Network Function Virtualization (NFV) architectures such that virtual machines may be established on one or more of these network nodes and/or include dedicated physical hardware for a particular network slice. These virtual machines and/or dedicated physical hardware may then be tailored to a particular use case (such as for a particular service or a particular network operator) by suitable configuration. In this embodiment, the first and second radio access networks 110, 210, first and second backhaul networks 130, 230 and first and second core networks 150, 250 each have a network slice management node having a database identifying each network slice in that network domain. This database stores an identifier for each network slice and values for one or more attributes (e.g. capacity, latency, etc.) of each network slice.

To form a cellular network as an internetwork between a radio access, backhaul and core network, a network slice may be formed as a concatenation of domain-specific network slices in the radio access, backhaul and core network domains. This is known as an "end-to-end" network slice and is illustrated in FIG. 2. For example, a first end-to-end network slice optimized for service type 1 (e.g. voice) may be formed as a combination of network slice 110-2 in the first radio access network, network slice 130-2 in the first backhaul network 130, and network slice 150-2 in the first core network 150. This end-to-end network slice may then form a complete logical cellular network to serve UEs connected to the first radio access network 110 with a service optimized for voice. Similarly, a second end-to-end network slice may be established which is optimized for service type 2 (e.g. a virtual reality application) as a combination of network slice 110-3 in the first radio access network 110, network slice 230-2 in the second backhaul network 230, and network slice 150-3 in the first core network 150. Although not shown in FIG. 2, the second radio access network 210 and second core network 250 also implement their respective sets of network slices which may also be part of end-to-end network slices via the first or second backhaul networks. Furthermore, each network may implement many more network slices, and those shown in FIG. 2 are for illustrative purposes only.

Figure 3:
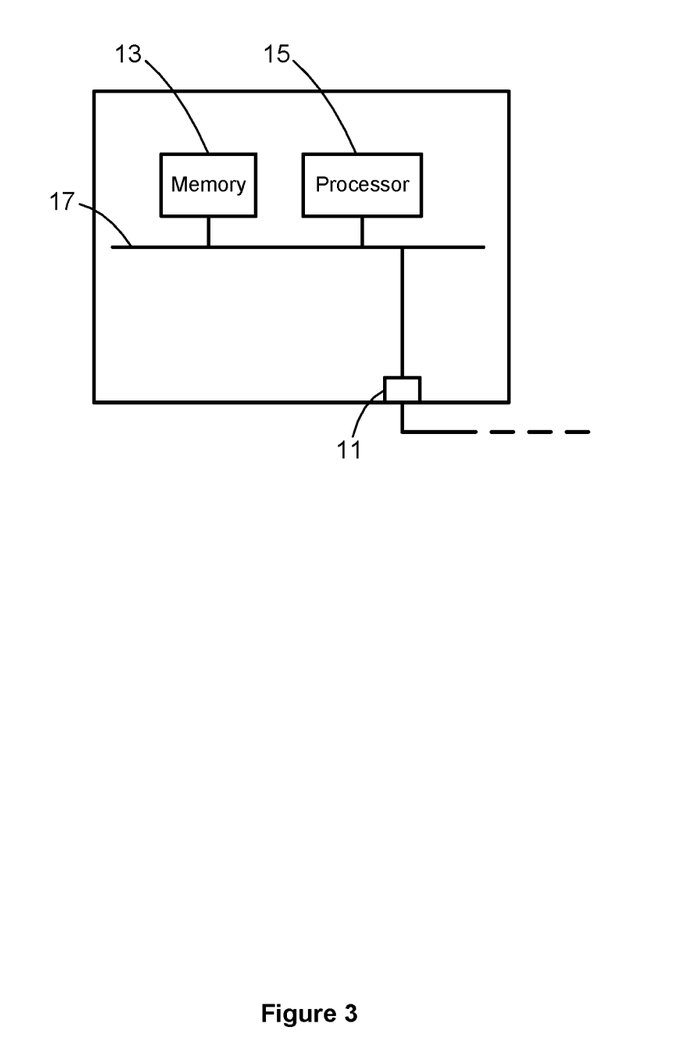
FIG. 3 is a schematic diagram of a network slice mapping node of the cellular network of FIG. 1.

The network slice mapping node 10 is shown in more detail in FIG. 3. The network slice mapping node 10 includes a transceiver 11 for communicating with each network, memory 13 and a processor 15, all connected via bus 17. The memory includes a network slice database, which stores data relating to all network slices established on the first and second radio access, backhaul, and core networks 110, 210, 130, 230, 150, 250, including an identifier for the network slice (used in the network's domain) and values for one or more attributes of that network slice. The combination of the network identifier and the network slice identifier creates a global network slice identifier that distinguishes a network slice from any other network slice of any other network. The network slice mapping node 10 receives data from the network slice management nodes of the first and second radio access, backhaul and core networks 110, 210, 130, 230, 150, 250 upon any change to their network slice offerings (such as on establishment of a new network slice, modification of an identifier/attribute for an existing network slice, or termination of a network slice) via the transceiver 11, and updates the database in memory 13. The processor 15 includes a network slice mapping function, which will be described in more detail in the embodiments of the method of this disclosure.

In this embodiment, the first and second radio access, backhaul and core networks implement the following network slices having the following identifiers and attributes:

TABLE 1

Table illustrating data relating to network slices stored in the network slice mapping node database

| Network ID | Network Type | Network Slice ID | Attribute 1 | ... | Attribute N |
|---|---|---|---|---|---|
| 110 | Radio Access | 1 | $A_1^{110-1}$ | ... | $A_N^{110-1}$ |
| 110 | Radio Access | 2 | $A_1^{110-2}$ | ... | $A_N^{110-2}$ |
| 110 | Radio Access | 3 | $A_1^{110-3}$ | ... | $A_N^{110-3}$ |
| 210 | Radio Access | A | $A_1^{210-A}$ | ... | $A_N^{210-A}$ |
| 210 | Radio Access | B | $A_1^{210-B}$ | ... | $A_N^{210-B}$ |
| 210 | Radio Access | C | $A_1^{210-C}$ | ... | $A_N^{210-C}$ |
| 130 | Backhaul | 1 | $A_1^{130-1}$ | ... | $A_N^{130-1}$ |
| 130 | Backhaul | 2 | $A_1^{130-2}$ | ... | $A_N^{130-2}$ |
| 230 | Backhaul | α | $A_1^{230-\alpha}$ | ... | $A_N^{230-\alpha}$ |
| 230 | Backhaul | β | $A_1^{230-\beta}$ | ... | $A_N^{230-\beta}$ |
| 150 | Core | 1 | $A_1^{150-1}$ | ... | $A_N^{150-1}$ |
| 150 | Core | 2 | $A_1^{150-2}$ | ... | $A_N^{150-2}$ |
| 150 | Core | 3 | $A_1^{150-3}$ | ... | $A_N^{150-3}$ |
| 250 | Core | 1 | $A_1^{250-1}$ | ... | $A_N^{250-1}$ |
| 250 | Core | 2 | $A_1^{250-2}$ | ... | $A_N^{250-2}$ |
| 250 | Core | 3 | $A_1^{250-3}$ | ... | $A_N^{250-3}$ |

Figure 4:
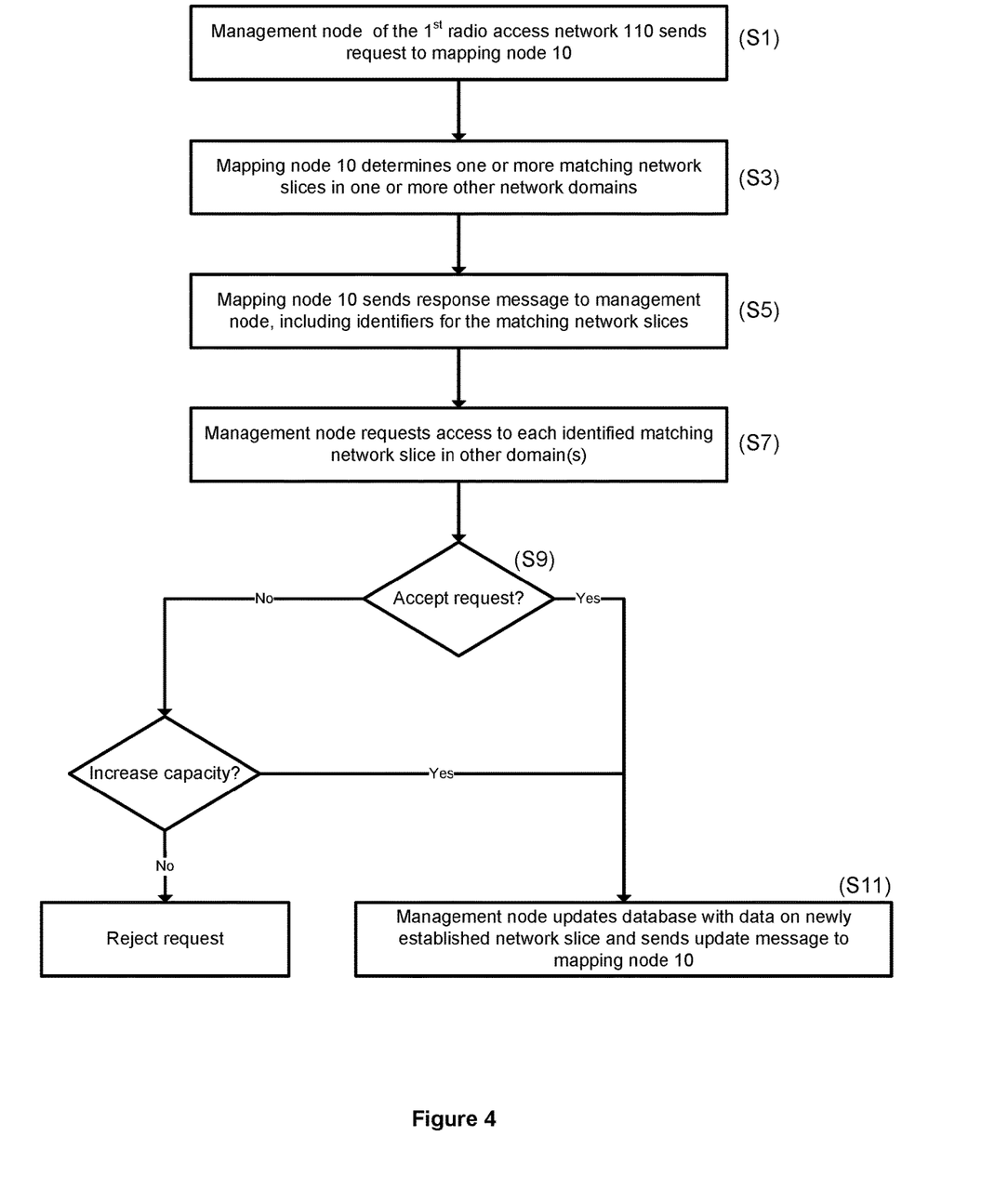
FIG. 4 is a flow diagram of a first embodiment of a method of the present disclosure

A first embodiment of a method of the present disclosure will now be described with reference to FIG. 4. In this embodiment, the first and second radio access, backhaul and core networks have network slices as noted in Table 1 above, and the network slice mapping node 10 maintains a database containing the information in Table 1 above. This first embodiment relates to the network slice management node of the first radio access network 110 establishing a new multi-domain network slice (i.e. across the radio access, backhaul and core network domains, such that it is an "end-to-end" slice), which will include (as one of its constituent network slices) a new network slice to be established on the first radio access network 110. This new multi-domain network slice is to be established according to a set of requirements for one or more attributes. These attributes may include, for example, one or more of: control plane throughput per subscriber, user plane throughput per subscriber, latency, jitter, and/or number of subscribers. Furthermore, these attributes may be network domain specific attributes such that the value in each domain must satisfy a condition (e.g. the number of subscribers in the core network slice must be less than x, whereas the number of subscribers in the radio access slice must be less than y), and end-to-end cumulative attributes such that the summed values across all domains must satisfy a condition (e.g. the sum of the latency values of each of the radio access, backhaul and core network domains must be less than z milliseconds).

In S1, the network slice management node of the first radio access network 110 sends a request message to the network slice mapping node 10 requesting identities of one or more network slices in the backhaul network domain and one or more network slices in the core network domain that satisfy the requirements of the new multi-domain network slice. In this embodiment, the request therefore includes: an identifier for the first radio access network (i.e. 110), an identifier of the new network slice being established on the first radio access network (i.e. 4), capability data indicating the capabilities of the new network slice being established on the first radio access network for the one or more attributes, and requirement data indicating the requirements of the new multi-domain network slice for the one or more attributes. In this embodiment, the request further identifies a priority value for each attribute representing the relative importance of each attribute to the performance of the network slice.

In S3, the network slice mapping node 10 receives this request and, in response, determines one or more matching network slices in the backhaul network domain and one or more matching network slices in the core network domain. The network slice mapping node 10 therefore retrieves the identities of all network slices associated with each backhaul network (e.g. a first network slice 130-1 and a second network slice 130-2 of the first backhaul network 130, and a first network slice 230-a and a second network slice 23013 of the second backhaul network 230), and of all network slices associated with each core network (e.g. a first network slice 150-1, second network slice 150-2 and third network slice 150-3 of the first core network 150, and a first network slice 250-1, second network slice 250-2 and third network slice 250-3 of the second core network 250) and their corresponding capability data indicating each network slice's capability for the one or more attributes. In this embodiment, the matching process identifies one or more matches based on the following logic. First, the matching process sums values of each end-to-end cumulative attribute (e.g. latency) to identify one or more network slices in the first or second backhaul network and one or more network slices in the first or second core network that satisfy the respective requirement of the new multi-domain network slice. For example, the latency value of the new network slice to be established in the first radio access network 110, the latency value of the first network slice 130-1 of the first backhaul network 130 and the latency value of the first network slice 150-1 of the first core network 150 may be summed to determine if that candidate multi-domain network slice would satisfy the end-to-end latency requirement. This is performed for all possible combinations of multi-domain network slices and for all end-to-end cumulative attributes to identify a subset of candidate multi-domain network slices. Secondly, the matching process determines whether each network domain specific attribute is satisfied by each network slice of the first and second backhaul networks and first and second core networks, to further eliminate candidate multi-domain network slices that include any network slice that does not satisfy a network domain specific attribute. If more than one candidate multi-domain network slice remains, then the candidate multi-domain network slice offering the best performance (e.g. lowest latency) may be selected, in which the relative priority of the attributes is used to encourage selection of a multi-domain network slice offering the best performance for a relatively important attribute. Furthermore, commercial factors may be used (e.g. the cost of using the slice) to influence the selection.

In this example, the network slice matching function selects the second network slice 130-2 of the first backhaul network 130 and the first network slice 250-1 of the second core network 250 to become part of the new multi-domain network slice based on their respective capabilities.

In S5, the network slice mapping node 10 sends a response message to the network slice management node of the first radio access network 150 with an identifier for the second network slice 130-2 of the first backhaul network 130 and an identifier for the first network slice 250-1 of the second core network 250.

In S7, the network slice management node of the first radio access network 110 sends a first request message to the first backhaul network 150 requesting use of its second network slice 130-2, and a second request message to the second core network 250 requesting use of the first network slice 250-1. The first and second request messages also identify the capacity requirements.

In S9, the first backhaul network 150 determines if the second network slice 130-2 has sufficient capacity to accommodate the request and, if so, accepts the request by sending an acknowledgement message to the network slice management node of the first radio access network 110 with an identifier to inform the first radio access network 110 to route traffic to the second network slice 130-2 (which may be different from the identifier used in the network slice mapping node's database e.g. a VPN ID, Ethernet ID, CoS packet marking, etc.). Similarly, the second core network 250 determines if its first network slice 250-1 has sufficient capacity to accommodate the request and, if so, accepts the request by sending an acknowledgement message to the network slice management node of the first radio access network 110 with an identifier to inform the first radio access network 110 to route traffic to the first network slice 250-1.

In the event one or both of the first backhaul or second core networks do not have sufficient capacity to accommodate the request, then they either increase capacity or reject the request. In an enhancement to the above process, the network slice mapping node 10 may identify a series of matches in order of suitability (that is, the best match, the $2^{nd}$ best match, etc.) for each network domain, and in the event of a rejection due to capacity constraints (or where the selection of backhaul network slice affects the set of choices of core network slice, since each backhaul network provider may have different choices of core network provider) then the network slice management node of the first radio access network 110 may establish the network slice using the next best match.

Once the network slice management node of the first radio access network 110 has established the new network slice, it records the identifier and values for the attributes of the new network slice (which may differ from the original values requested of the backhaul and core networks) in its network slice management node and sends an update message to the network slice mapping node 10 which, upon receipt, also updates its database with the new network slice's identifier and attributes (S11).

This embodiment of the disclosure provides the benefit that each network domain (e.g. the radio access network domain, the backhaul network domain, the core network domain) in the cellular network may establish a multi-domain network slice by determining which network slice of another network domain has the most suitable characteristics. This is achieved without having to either consult each network of the other domain(s) to determine their network slices' identities and characteristics (which would increase control signaling), or by using universal network slice identities and characteristics (which would limit flexibility). Instead, a central database storing the identifiers and attributes for each network slice of each network in each domain is used to quickly identify one or more suitable network slices with minimal control signaling.

In the above embodiment, the network slice mapping node 10 receives a request from a network entity establishing a network slice in which the request identifies a particular set of attributes. The network slice mapping node 10 then responds to this request with identifiers for matching network slices in other networks. However, in an alternative arrangement, the network slice mapping node 10 may be part of an application provider (e.g. a Video on Demand service having one or more service levels) and its database may store the identifiers of each network slice of each network domain that satisfy the one or more service levels. The network entity establishing a network slice between end users and the application provider may then send a request to the network slice mapping node 10 identifying the service level it requires, and the network slice mapping node 10 may then return identifiers for the best matching network slice(s) in other networks of other network domains.

A second embodiment of the disclosure will now be described. This second embodiment is similar to the first embodiment described above, except there is no network slice mapping node and instead each network slice management node includes the network slice mapping function. In this second embodiment, a network entity establishing a new network slice sends a request message to a network of another domain (e.g. a network slice management node of the first radio access network 110 sends a request message to the network slice management node of the first backhaul network 130) which identifies the requirements for the new multi-domain network slice for one or more attributes. The network slice management node of the first backhaul network 130 may respond to this request message by consulting its local database to determine the identities of its network slices which best match those requirements (in the same manner as the first embodiment), and then sending a response message with an identifier of the matching network slice(s). This second embodiment also realizes the benefit over the prior art of identifying suitable network slices of networks of other domains without having universally applicable slice identifiers and/or using the same network slices in each domain.

In the above embodiments, the cellular network is an internetwork of several network types, including a radio access network, a backhaul network and a core network. The skilled person will understand that the radio access network includes wireless transceiver apparatus (e.g. a base station) and related apparatus for communicating with UEs, a core network includes switches and routers for establishing connectivity and for routing network traffic to/from its final destination/source, and a backhaul connection comprises the connections and associated apparatus for connecting the radio access and core networks.

In the first embodiment above, the cellular network includes a network slice mapping node which contains a database storing data on all network slices for all networks in all domains. However, this is non-essential and the network slice mapping node database may store data for a subset of network slices for a subset of all networks in a subset of domains, such as network slices relating to a particular network domain (e.g. backhaul networks only), network slices relating to a particular network operator, and/or network slices optimized for a particular service type.

In embodiments above, network nodes of any sub-domain (e.g. the radio access network, backhaul network or core network) may communicate with the network slice mapping node to identify a suitable network slice of another domain. The network slice mapping node may therefore be owned/operated by multiple entities (e.g. one or more of the entities owning/operating the first radio access network, second radio access network, first backhaul network etc.) or owned/operated by an independent entity. Furthermore, the network slice mapping node may be part of a particular domain (e.g. the radio access network, backhaul network, or core network) and identify suitable network slices in other network domains, and update its database of network slices in other domains by receiving data from those other domains upon any change in their network slice offering. Furthermore, each domain may include such a network slice mapping node.

In the above embodiments, the first radio access network 110 established a new multi-domain network slice which is an end-to-end network slice (that is, it includes network nodes of the radio access network, backhaul network and core network). However, the skilled person will understand that it is non-essential that the multi-domain network slice is an end-to-end network slice, but is may only be across multiple domains (e.g. a network slice in the radio access domain and a network slice in the backhaul domain). Furthermore, in the above embodiments, the new multi-domain network slice includes, as a constituent part, a network slice being established in the radio access network. This is also non-essential as the new multi-domain network slice may use a pre-existing network slice in the radio access network.

Although the above embodiments are based on a cellular telecommunications network, the skilled person will understand that the above concepts may equally be applied to other forms of networks, including wired networks having at least two network domains being of different network types being one of a wired access network, backhaul network and core network.

The skilled person will also understand that any combination of features is possible within the scope of the invention, as claimed.

The invention claimed is:

1. A method for establishing a multi-domain network slice in a telecommunications network, the telecommunications network being an internetwork of a first network domain and a second network domain, in which the first network domain and the second network domain are of different network types being one of an access network, a backhaul network, or a core network, wherein a network node includes a network slice database storing data on a plurality of network slices established in the first network domain and the second network domain, the method comprising:

the network node receiving data indicating a change to the plurality of network slices established in the first network domain and the second network domain and, in response, updating the network slice database;

the network node receiving a request from one of a first set of network nodes in the first network domain to establish a multi-domain network slice across the first network domain and the second network domain, the multi-domain network slice using a first network slice operating on one or more of the first set of network nodes of the first network domain and a second network slice operating on one or more of a second set of network nodes of the second network domain, wherein the request includes requirement data for the multi-domain network slice for one or more attributes;

the network node identifying the second network slice by:
retrieving, from the network slice database, network slice capability data for the second network slice, the network slice capability data indicating a capability of the second network slice for the one or more attributes,
comparing the retrieved network slice capability data for the second network slice with the requirement data for the multi-domain network slice, and
selecting the second network slice based on the comparison; and the network node responding to the request with an identifier for the second network slice.

2. The method as claimed in claim 1, wherein the network node is located remote from the first network domain and the second network domain.

3. The method as claimed in claim 1, wherein the request further includes network slice capability data of the first network slice for the one or more attributes, and the comparing includes comparing the requirement data for the multi-domain network slice for one or more attributes with a sum of:
the capability data of the first network slice for the one or more attributes, and
the retrieved network slice capability data of the second network slice for the one or more attributes.

4. The method as claimed in claim 1, wherein the request further includes a weighting associated with each of the one or more attributes, and the comparing of the capability of the second network slice for the one or more attributes with the requirement data for the one or more attributes uses the weighting associated with each attribute.

5. The method as claimed in claim 1, wherein the first network domain is operated by a first network operator and the second network domain is operated by a second network operator.

6. The method as claimed in claim 1, wherein the network node identifies the second network slice and a third network slice by:
retrieving, from the network slice database, network slice capability data for the second network slice and the third network slice, the network slice capability data indicating the capability of the second network slice for the one or more attributes and a capability of the third network slice for the one or more attributes;
comparing the retrieved network slice capability data for the second network slice and the third network slice with requirement data for the multi-domain network slice; and
selecting the second network slice and the third network slice based on the comparison, and the network node responding to the request includes the identifier for both the second network slice and the third network slice.

7. The method as claimed in claim 6, wherein the third network slice is of a third network domain, and the first network slice and the third network domain are of different network types and the third network domain is one of the access network, the backhaul network, or the core network types.

8. The method as claimed in claim 1, wherein the telecommunications network is a cellular telecommunications network and the first network domain and the second network domain are of different network types being one of a radio access network, a backhaul network, or a core network.

9. A non-transitory computer-readable storage medium storing a computer program product comprising instructions which, when the computer program is executed by a computer, cause the computer to carry out the method of claim 1.

10. A network node for establishing a multi-domain network slice in a telecommunications network, the telecommunications network being an internetwork of a first network domain and a second network domain, in which the first network domain and the second network domain are of different network types being one of an access network, a backhaul network, or a core network, the network node comprising:
   memory including a network slice database storing data on a plurality of network slices established in the first network domain and the second network;
   a transceiver configured to receive:
      data indicating a change to the plurality of network slices established in the first network domain and the second network domain, and
      a request from one of a first set of network nodes in the first network domain to establish a multi-domain network slice across the first network domain and the second network domain, the multi-domain network slice using a first network slice operating on one or more of the first set of network nodes of the first network domain and a second network slice operating on one or more of a second set of network nodes of the second network domain, wherein the request includes requirement data for the multi-domain network slice for one or more attributes; and
   a processor configured to:
      update the network slice database in response to the data indicating a change to the plurality of network slices, and
      identify the second network slice by:
         retrieving, from the network slice database, network slice capability data for the second network slice, the network slice capability data indicating a capability of the second network slice for the one or more attributes,
         comparing the retrieved network slice capability data for the second network slice with the requirement data for the multi-domain network slice, and
         selecting the second network slice based on the comparison;
   wherein the transceiver is further configured to respond to the request with an identifier for the second network slice.

* * * * *

UNITED STATES PATENT AND TRADEMARK OFFICE
CERTIFICATE OF CORRECTION

PATENT NO. : 12,089,147 B2
APPLICATION NO. : 17/310516
DATED : September 10, 2024
INVENTOR(S) : Andrew Corston-Petrie and Maria Cuevas Ramirez It is certified that error appears in the above-identified patent and that said Letters Patent is hereby corrected as shown below:

On the Title Page

In item (73), in Column 1, under "Assignee", Line 2, delete "Limited Compny (GB)" and insert -- Limited Company, London (GB) --.

In item (56), in Column 2, under "Other Publications", Line 1, delete "28 801" and insert -- 28.801 --.

On the page 2, item (56), in Column 1, under "Other Publications", Line 7, delete "System;Stage" and insert -- System; Stage --.

On the page 2, item (56), in Column 1, under "Other Publications", Line 15, delete "GB1901616.1mailed" and insert -- GB1901616.1 mailed --.

On the page 2, item (56), in Column 2, under "Other Publications", Line 1, delete "Deslucioles;" and insert -- Des Lucioles; --.

On the page 2, item (56), in Column 2, under "Other Publications", Lines 16-17, delete "Tncoordination" and insert -- TN coordination --.

On the page 2, item (56), in Column 2, under "Other Publications", Line 19, delete "Sophia-," and insert -- Sophia-Antipolis Cedex, --.

On the page 2, item (56), in Column 2, under "Other Publications", Line 24, delete "R3-161133,May" and insert -- R3-161133, May --.

On the Page 2, item (56), in Column 2, under "Other Publications", Line 52, delete "sa \WG2" and insert -- sa/WG2 --.

Signed and Sealed this
Fourteenth Day of January, 2025

Derrick Brent
*Acting Director of the United States Patent and Trademark Office*

CERTIFICATE OF CORRECTION (continued)
U.S. Pat. No. 12,089,147 B2

In the Drawings

On sheet 4 of 4, in Figure 4, Reference numeral (S1), Line 1, delete "node   of" and insert -- node of --.

In the Specification

In Column 4, Line 2, delete "disclosure" and insert -- disclosure. --.

In Column 6, Line 42, delete "230-a" and insert -- 230-α --.

In Column 6, Line 42, delete "230ß" and insert -- 230-β --.

In the Claims

In Column 11, Line 32, in Claim 10, delete "network;" and insert -- network domain; --.